United States Patent
Kim et al.

(10) Patent No.: US 10,391,406 B2
(45) Date of Patent: Aug. 27, 2019

(54) APPARATUS AND METHOD FOR SAFE DRIVE INDUCING GAME

(71) Applicant: Hyundai Motor Company, Seoul (KR)

(72) Inventors: Jin Kwon Kim, Gwangmyeong-si (KR); Byoung Joon Lee, Hwaseong-si (KR); Ho Choul Jung, Suwon-si (KR); Sam Yong Kim, Hwaseong-si (KR)

(73) Assignee: Hyundai Motor Company, Seoul (KR)

( * ) Notice: Subject to any disclaimer, the term of this patent is extended or adjusted under 35 U.S.C. 154(b) by 879 days.

(21) Appl. No.: 14/010,069

(22) Filed: Aug. 26, 2013

(65) Prior Publication Data

US 2014/0342790 A1 Nov. 20, 2014

(30) Foreign Application Priority Data

May 20, 2013 (KR) .................. 10-2013-0056390

(51) Int. Cl.
*A63F 13/803* (2014.01)
*A63F 13/5375* (2014.01)

(52) U.S. Cl.
CPC ........ *A63F 13/803* (2014.09); *A63F 13/5375* (2014.09)

(58) Field of Classification Search
CPC ............. A63F 13/10; A63F 2300/8017; G09B 19/167; G09B 9/05; G09B 9/04; G09B 9/052
USPC ........................................................ 434/65
See application file for complete search history.

(56) References Cited

U.S. PATENT DOCUMENTS

| 5,888,074 | A | * | 3/1999 | Staplin | G09B 9/052 340/576 |
| 5,910,046 | A | * | 6/1999 | Wada | A63F 13/10 340/323 R |
| 6,117,008 | A | * | 9/2000 | Machiguchi | A63F 13/005 463/6 |
| 6,200,138 | B1 | * | 3/2001 | Ando | A63F 13/10 273/148 B |
| 6,227,862 | B1 | * | 5/2001 | Harkness | G09B 9/05 434/238 |

(Continued)

FOREIGN PATENT DOCUMENTS

JP 2001-074764 A 3/2001
KR 10 2001 0016334 3/2001

(Continued)

*Primary Examiner* — Xuan M Thai
*Assistant Examiner* — Sadaruz Zaman
(74) *Attorney, Agent, or Firm* — Mintz Levin Cohn Ferris Glovsky and Popeo, P.C.; Peter F. Corless

(57) ABSTRACT

An apparatus and a method for a safe drive inducing game that includes a controller configured to execute the safe drive inducing game when a driver attention dispersion state is detected when a vehicle is driven. In addition, the controller recognizes a target driving path from vehicle driving information when executing the safe drive inducing game and generates a path guidance display according to the recognized target driving path to display on a game screen. The controller determines whether the vehicle follows the path guidance display by comparing a driving state of the vehicle with a position of the path guidance display displayed on the game screen and calculates a score of the safe drive inducing game according to whether the vehicle follows the path guidance display.

11 Claims, 5 Drawing Sheets

(56) References Cited

U.S. PATENT DOCUMENTS

| | | | | |
|---|---|---|---|---|
| 6,417,856 B1* | 7/2002 | Tamura | A63F 13/10 345/474 |
| 8,598,977 B2* | 12/2013 | Maalouf | G06Q 30/02 340/3.1 |
| 2002/0120589 A1* | 8/2002 | Aoki | A63F 13/10 705/400 |
| 2003/0220722 A1* | 11/2003 | Toba | G10K 15/02 701/1 |
| 2004/0110565 A1* | 6/2004 | Levesque | A63F 13/10 463/42 |
| 2007/0077541 A1* | 4/2007 | Champagne | A63F 13/10 434/62 |
| 2007/0149284 A1* | 6/2007 | Plavetich | A63F 13/00 463/37 |
| 2007/0155458 A1* | 7/2007 | Tipping | A63F 13/10 463/6 |
| 2008/0021640 A1 | 1/2008 | Pyo | |
| 2008/0032796 A1* | 2/2008 | Matsuyama | A63F 9/00 463/37 |
| 2008/0039216 A1* | 2/2008 | Higashiguchi | A63F 13/08 463/47 |
| 2008/0254417 A1* | 10/2008 | Mohamed | G09B 9/04 434/69 |
| 2010/0047744 A1* | 2/2010 | Miura | B60W 40/09 434/66 |
| 2010/0112529 A1* | 5/2010 | Miura | B60T 8/3275 434/65 |
| 2010/0277489 A1* | 11/2010 | Geisner | G06F 3/011 345/581 |
| 2011/0076651 A1* | 3/2011 | Best | G09B 9/05 434/71 |
| 2011/0304465 A1* | 12/2011 | Boult | B60K 28/06 340/576 |
| 2012/0309521 A1* | 12/2012 | Nishiya | A63F 13/10 463/31 |
| 2013/0316311 A1* | 11/2013 | England | G09B 19/167 434/65 |
| 2014/0267263 A1* | 9/2014 | Beckwith | G06T 15/08 345/424 |
| 2014/0272812 A1* | 9/2014 | Hing | G02B 27/01 434/69 |
| 2016/0055764 A1* | 2/2016 | Kujala | B60W 50/14 434/66 |

FOREIGN PATENT DOCUMENTS

| | | |
|---|---|---|
| KR | 10-2005-0034862 A | 4/2005 |
| KR | 10 2008 0008682 | 4/2008 |
| KR | 10-2008-0102100 A | 11/2008 |
| KR | 10-2010-0034364 A | 4/2010 |
| KR | 1020110057931 | 6/2011 |
| KR | 10 2012 0013762 | 2/2012 |
| KR | 10-2013-0009125 A | 1/2013 |

* cited by examiner

APPARATUS AND METHOD FOR SAFE
DRIVE INDUCING GAME

CROSS-REFERENCE TO RELATED
APPLICATION

This application is based on and claims priority from Korean Patent Application No. 10-2013-0056390, filed on May 20, 2013 in the Korean Intellectual Property Office, the disclosure of which is incorporated herein in its entirety by reference.

BACKGROUND

Field of the Invention

The present invention relates to an apparatus and a method for safe drive inducing game, and to a technology capable of inducing a safe drive by executing a safe drive inducing game when an attention dispersion state of the driver is detected.

Description of the Related Art

Many accidents occur when a vehicle is driven in an attention dispersion state. To prevent such accidents due to the attention dispersion of the driver, a scheme of stimulating the driver by outputting an alarm and a message, driving a conditioning apparatus, or vibrating a seat to concentrate on driving has been implemented. However, the driver may not recognize these stimulations in a drowsiness state. Hence, the drowsiness is temporarily reduced. Therefore, a scheme capable of stimulating the driver is required under a condition that does not interfere with driving.

SUMMARY

The present invention provides an apparatus and a method for safe drive inducing game capable of inducing safe driving by automatically executing a safe drive inducing game in which a vehicle is driven in an attention dispersion state.

The present invention further provides an apparatus and a method for safe drive inducing game that prevents an attention dispersion state from being generated during driving of the vehicle by displaying a safe drive inducing game on a head up display (HUD) and obtaining a game score in which a driver drives following a specific display inducing the safe drive to arouse the driver's interest.

In accordance with an aspect of the present invention, an apparatus for safe drive inducing game may include: a game controller configured to execute a safe drive inducing game in which an attention dispersion state of the driver is detected during driving of the vehicle or a driver's request is detected; a path guidance display generator configured to recognize a target driving path from driving information regarding a vehicle when executing the safe drive inducing game and configured to generate the path guidance display according to the recognized target driving path to display on a game screen; a path following determiner configured to determine whether the vehicle follows the path guidance display by comparing the driving state of the vehicle with a position of the path guidance display displayed on the game screen; and a game score calculator configured to calculate a score of the safe drive inducing game according to whether the vehicle follows the path guidance display.

In accordance with an aspect of the present invention, an apparatus for safe drive inducing game may further include: a driver state monitoring unit configured to detect an attention dispersion state of the driver during driving of the vehicle. The driver state monitoring unit may be configured to detect the attention dispersion state of the driver using at least one of an image, biological information, and a driving pattern of the driver.

In accordance with an aspect of the present invention, an apparatus for safe drive inducing game may further include: a driving information detector configured to detect driving information including at least one of driving road information, navigation information, control area network (CAN) data, and an inter-vehicle distance. Furthermore, the apparatus may further include: a safe driving condition determiner configured to determine whether the driving state of the vehicle corresponds to a safe driving condition by comparing the driving state of the vehicle with the pre-defined safe driving condition. The game score calculator may be configured to add or subtract a score obtained from the safe drive inducing game according to whether the driving state of the vehicle corresponds to the safe driving condition. The game screen may be displayed on a head up display (HUD) of the vehicle. The game controller may be configured to determine whether to execute the safe drive inducing game to the driver and execute the safe drive inducing game based on the selection of the driver for the determination when the attention dispersion state of the driver is detected.

In accordance with an aspect of the present invention, an apparatus for safe drive inducing game may further include: a communicator that connects to a game server configured to store and manage game data for each driver and transmit the game data of the driver driving the vehicle to the game server.

In accordance with another aspect of the present invention, a method for safe drive inducing game, may include: executing, by a controller, a safe drive inducing game when an attention dispersion state of driver is detected during driving of a vehicle or a driver requests; recognizing, by the controller, a target driving path from driving information regarding vehicle when executing the safe drive inducing game and generating a path guidance display according to the recognized target driving path to display on a game screen; determining, by the controller, whether the vehicle follows the path guidance display by comparing a driving state of the vehicle with a position of the path guidance display displayed on the game screen; and calculating, by a controller, a score of the safe drive inducing game according to whether the vehicle follows the path guidance display.

BRIEF DESCRIPTION OF THE DRAWINGS

The objects, features and advantages of the present invention will be more apparent from the following detailed description in conjunction with the accompanying drawings, in which.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Exemplary embodiments of the present invention are described with reference to the accompanying drawings in detail. The same reference numbers are used throughout the drawings to refer to the same or like parts. Detailed descriptions of well-known functions and structures incorporated herein may be omitted to avoid obscuring the subject matter of the present invention.

Figure 1:
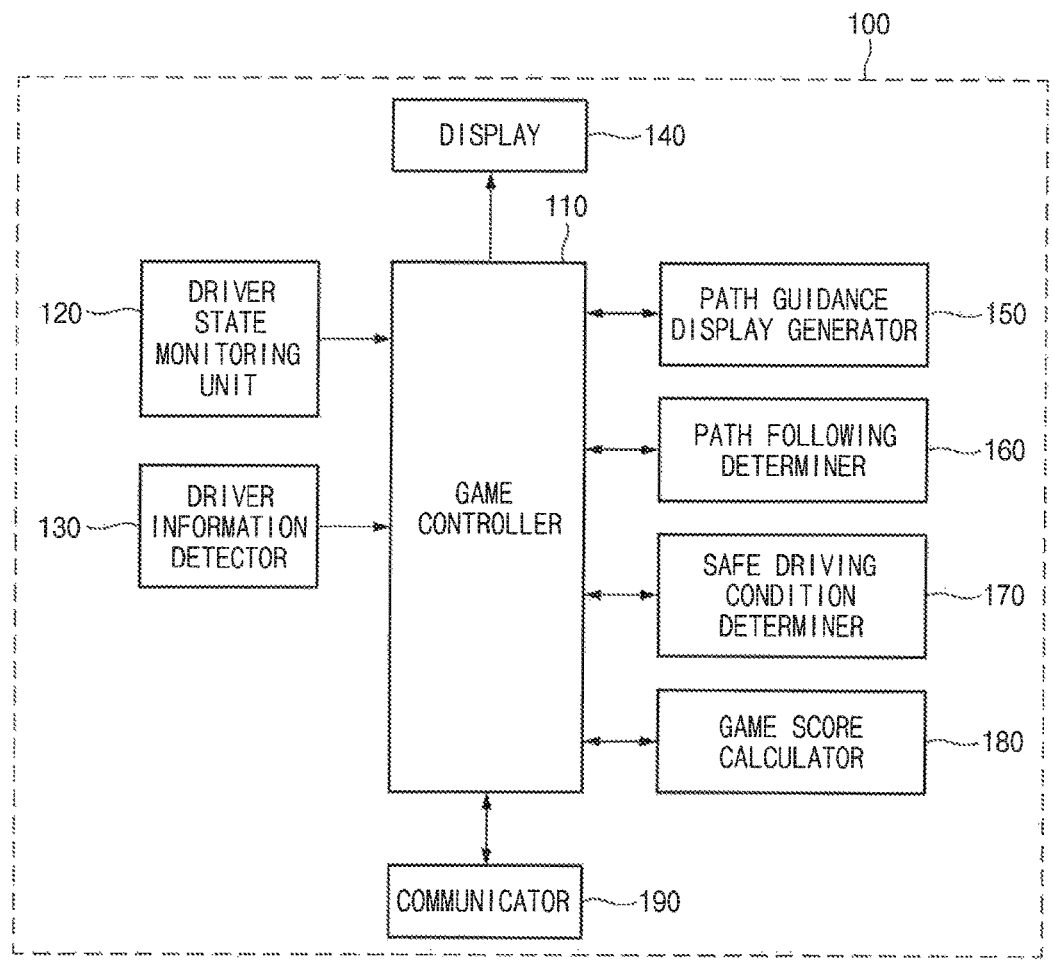
FIG. 1 is an exemplary block diagram illustrating a configuration of an apparatus for safe drive inducing game according to an exemplary embodiment of the present invention.

FIG. 1 is an exemplary block diagram illustrating a configuration of an apparatus for safe drive inducing game according to an exemplary embodiment of the present invention. Referring to FIG. 1, an apparatus 100 for safe drive inducing game may include a game controller 110, a driver state monitoring unit 120, a driving information detector 130, a display 140, a path guidance display generator 150, a path following determiner 160, a safe driving conditions determiner 170, a game score calculator 180, and a communicator 190. The game controller 110 may be configured to operate the driver state monitoring unit 120, driving information detection 130, display 140, path guidance display generator 150, path following determiner 160, safe driving conditions determiner 170, game score calculator 180, and communicator 190. In particular, the game controller 110 may be configured to monitor the result detected by the driver state monitoring unit 120 in real time and operate the execution of the safe drive inducing game, and operates an overall game operation when executing the safe drive inducing game.

The driver state monitoring unit 120 may be configured to detect the attention dispersion state of the driver while the vehicle is driven. As an example, the driver state monitoring unit 120 may be configured to detect the attention dispersion state of the driver using a driving pattern of the vehicle while the vehicle is driven. In addition, the driver state monitoring unit 120 may be configured to detect the attention dispersion state of the corresponding driver from an image of the driver captured while the vehicle is driven or a bio-signal obtained from the driver. However, a scheme for determining the attention dispersion state of the driver is not limited thereto and may be applied to any scheme that may determine the attention dispersion state of the driver in addition to the above-mentioned exemplary embodiments. In particular, the attention dispersion state of the driver may be a drowsiness state or a distraction state (e.g., a driver concentrates on actions other than driving). However, in the following examples, the attention dispersion state, which is the drowsiness state, will be described, but is not limited thereto.

Figure 2:
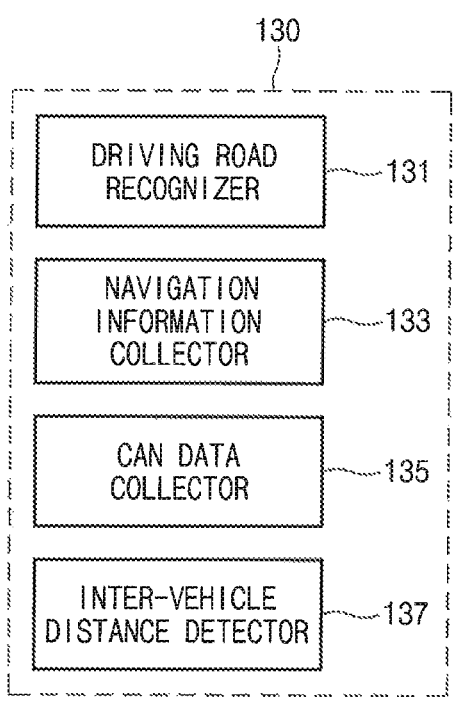
FIG. 2 is an exemplary block diagram illustrating a detailed configuration for a driving information detector of FIG. 1 according to an exemplary embodiment of the present invention.

The driving information detector 130 may include vehicle operation information, circumference environment information, driver state information, and the like while driving the vehicle. Specifically, the driving information detector 130 may include a driving road recognizer 131, a navigation information collector 133, a CAN data collector 135, and an inter-vehicle distance detector 137, controller by the controller, as shown in FIG. 2.

The driving lane recognizer 131 may be configured to recognize driving road information and lane information via a lane departure warning (LDW) system and a line keeping assistant system (LKAS). The navigation information collector 133 may be configured to collect the target driving path information, the circumference environment information, and the like from a navigation system of the vehicle. The CAN data collector 135 may be configured to collect the CAN data, that is, the driving state information according to operation of the vehicle. For example, the CAN data collector 135 may be configured to collect information such as driving speed, deceleration, acceleration, steering angle, and the like. The inter-vehicle distance detector 137 may be configured to detect a distance between the corresponding vehicle and the leading vehicle and the inter-vehicle distance information may be used to check the safe driving conditions, the driving pattern, or the like.

The display 140 may be a unit configured to display the game screen when executing the safe drive inducing game, and the head up display (HUD) may be used as the display, but is not limited thereto. Additionally, the game controller 110 may be configured to execute the safe drive inducing game in which the drowsiness driving of the driver may be detected by the driver state monitoring unit 120. In particular, when the attention dispersion state of the driver is detected, the game controller 110 may be configured to determine whether to execute the safe drive inducing game to the driver, and execute the safe drive inducing game based on the selection of the driver. In some cases, the game controller 110 may be configured to automatically execute the safe drive inducing game in which the attention dispersion state of the driver is detected.

Meanwhile, although the driver state monitoring unit 120 may not be configured to detect the attention dispersion state, the game controller 110 may be configured to execute the safe drive inducing game based on a request of the driver.

When the safe drive inducing game is executed by the game controller 110, the game screen may be displayed on the display 140 and the path guidance display generator 150 may be configured to recognize the target driving path from the driving information of the vehicle to generate the path guidance display according to the recognized target driving path, thereby displaying the path guidance display on the game screen in the display 140. In particular, the path guidance display generator 150 allows the path guidance display to be disposed at the substantial center of the current driving road to induce the driver to be able to drive a vehicle in the substantial center of the road.

Further, the path guidance display may be a unit configured to obtain the game score when the corresponding vehicle according to the driving information of the vehicle follows the path guidance display and may be displayed in many different forms such as a coin, a cake, a straight line, and the like.

The path following determiner 160 may be configured to determine whether the vehicle follows the path guidance display by comparing the driving state of the vehicle with a position of the path guidance display displayed on the game screen. In addition, the game score calculator 180 may be configured to calculate the game score based on the determining result of the path following determiner 160. As an example, the game score calculator 180 may be configured to add the determined score to the game score when the vehicle follows the corresponding path guidance display in response to determining that the vehicle follows the path guidance display displayed on the game screen.

Although not shown in FIG. 1, the apparatus for safe drive inducing game may output a sound via a sound outputting unit and a haptic via a haptic outputting unit when the vehicle follows the path guidance display displayed on the game screen. In particular, even when the vehicle does not follow the path guidance display, a warning sound or a haptic for warning may be output.

Moreover, the safe driving conditions determiner 170 may be configured to preset the safe driving conditions and determine whether the current driving state of the vehicle corresponds to the preset safe driving condition by comparing the current driving state of the vehicle with the preset safe driving condition. When the current driving state of the vehicle does not correspond to the preset safe driving conditions, the game score calculator 180 may be configured to subtract the game score. Alternatively, when the current driving state of the vehicle corresponds to the preset safe driving conditions, the game score calculator 180 may be configured to add a bonus score.

As an example, when the vehicle maintains a road reference speed or a predetermined speed, the game scores may be increased. On the other hand, when the vehicle is rapidly decelerated or accelerated, the game scores may be decreased. In addition, when the vehicle is driven in the substantial center of the road, the game score may be increased. On the other hand, when the vehicle frequently changes a lane or does not remain in the substantial center of the road, the game scores may be decreased. Furthermore, when the corresponding vehicle maintains a predetermined distance from the leading vehicle, the game scores may also be increased. As described above, the additional score may be added when driving suitable for the safe driving conditions, thereby inducing the safe driving.

Additionally, when the driving state of the vehicle corresponds to the safe driving conditions, the game score calculator 180 may be configured to change the path guidance display, for example, 10 point coin into 100 point gold coin, and the driver may obtain the 100 points when following the gold coin.

The above-mentioned game scheme is merely an exemplary embodiment, and the game scheme may be changed according to the exemplary embodiment and is not limited thereto.

Figure 3:
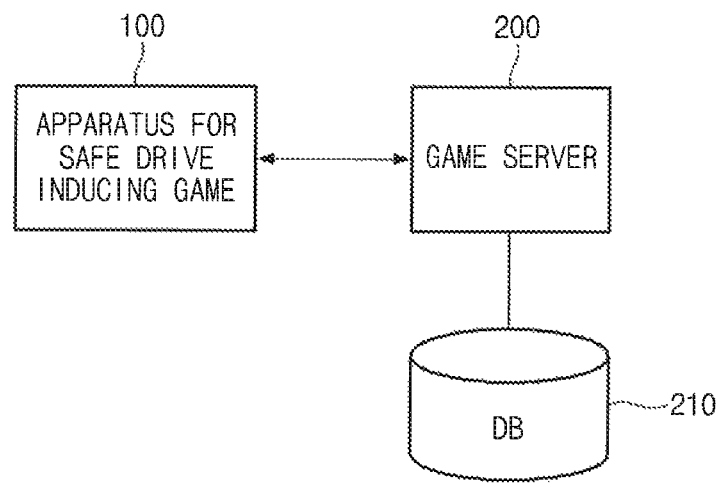
FIG. 3 is an exemplary block diagram illustrating a configuration of a system to which an apparatus for safe drive inducing game is applied according to an exemplary embodiment of the present invention.

Moreover, the apparatus 100 for safe drive inducing game according to the exemplary embodiment of the present invention may further include a communicator 190. The communicator 190 may be connected to an external game server 200 shown in FIG. 3 and may be configured to transmit the game score obtained by the corresponding driver while driving the vehicle to the external game server 200. In addition, the game server 200, executed by the controller, may be configured to store into the database (DB) 210 and manage the game data of the corresponding driver transmitted via the communicator 190 of the vehicle.

Furthermore, the game server 200 may be configured to compare the game data of each driver stored in the DB 210 to determine a game ranking, and a specific point may be rewarded according to the game ranking. In particular, the game server 200 may be configured to operate the game data associated with the oil company or the vehicle maintenance company and convert the game score of each driver into oiling points or after-sales service (A/S) points of the corresponding vehicle, to increase a ratio of game participation of the driver may be increased.

Figure 4:
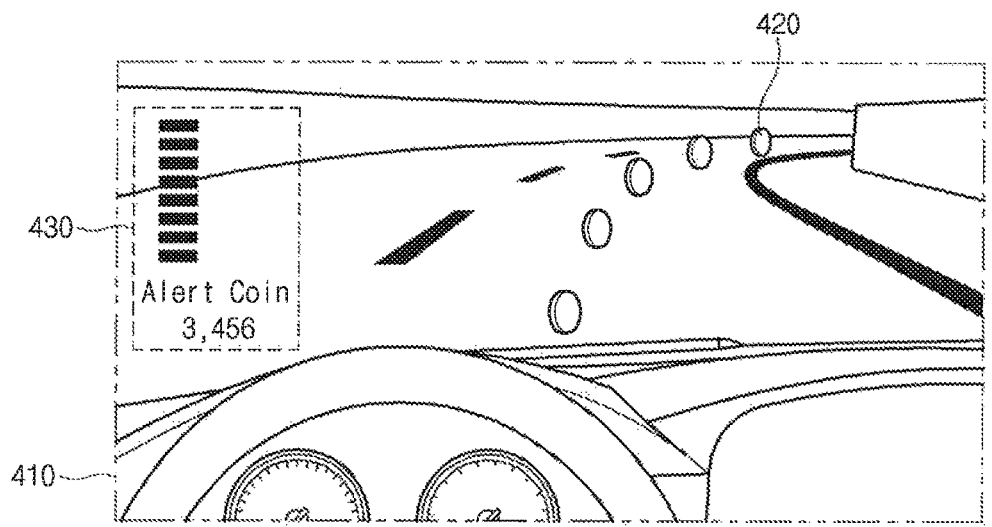
FIG. 4 is an exemplary diagram illustrating a game screen of an apparatus for safe drive inducing game according to an exemplary embodiment of the present invention.

FIG. 4 is an exemplary diagram showing a game screen of an apparatus for safe drive inducing game according to an exemplary embodiment of the present invention. As shown in FIG. 4, the apparatus for safe drive inducing game may be configured to display a game screen 410 of the safe drive inducing game on a head up display HUD of the vehicle when executing the game. The apparatus may be configured to generate the path guidance display 420 based on the target driving path and display on the game screen 410. In addition, on the game screen 410, the path guidance display 420 capable of obtaining the score may be disposed at the substantial center of the driving road to induce the safe driving of the driver, allowing the driver to obtain the game score every time the vehicle follows the path guidance display.

One side of the game screen 410 may be displayed with the game score 430 obtained during driving of the vehicle. When the driver obtains the game score following the path guidance display 420 displayed on the game screen 410, the game score displayed on the game screen 410 may be updated in real time.

Further, the form and the obtained score of the path guidance display 420 displayed on the game screen 410 may be changed according to whether the vehicle corresponds to the safe driving conditions. Therefore, in the apparatus for safe drive inducing game, the driver may follow the path guidance display 420 displayed on the game screen 410 to obtain the game score, to prevent a drowsiness driving by arousing the driver's interest and to induce the safe driving.

The flow of operating of the apparatus for safe drive inducing game according to the exemplary embodiment of the present invention will be described in more detail.

Figure 5:
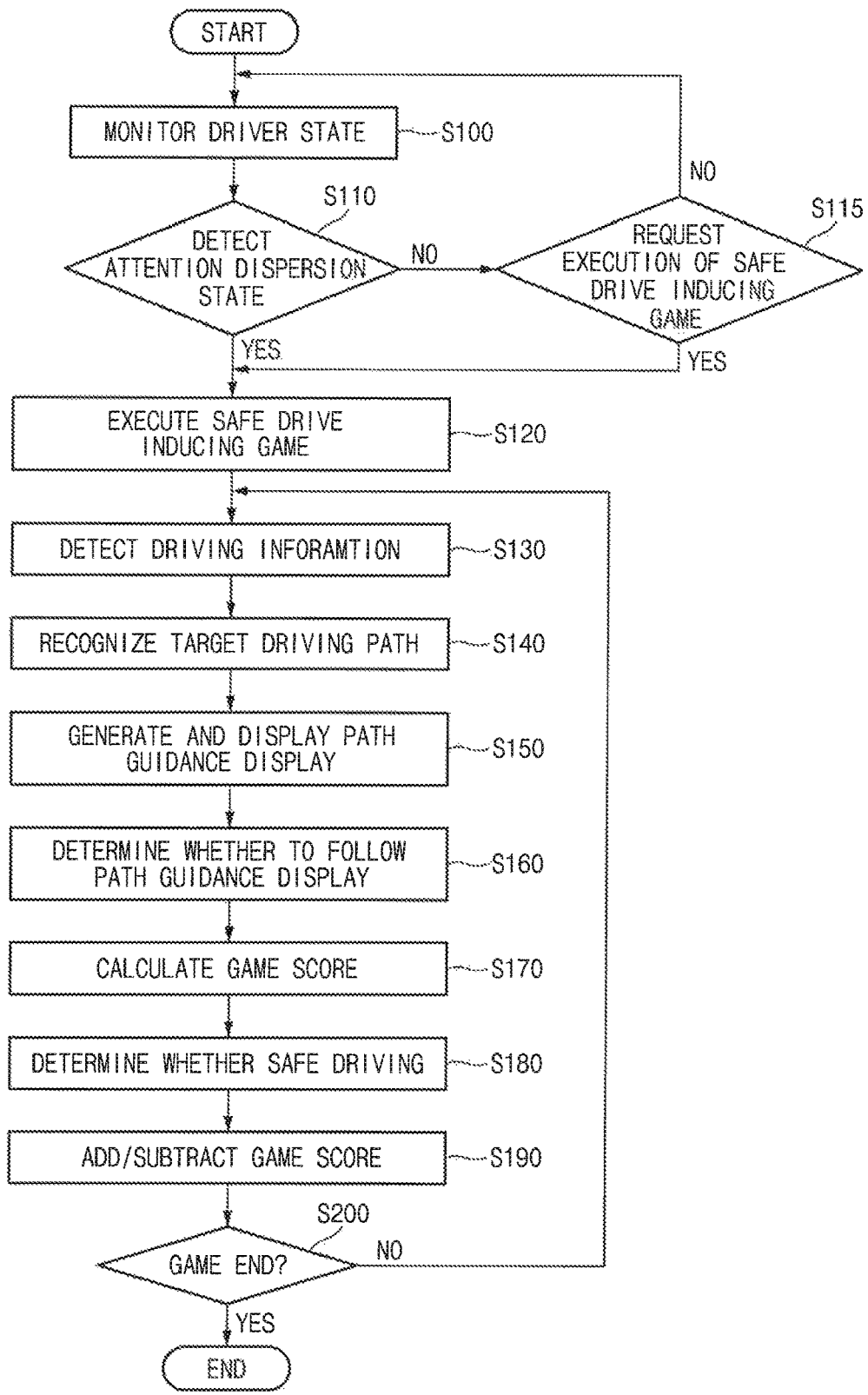
FIG. 5 is an exemplary flow chart illustrating a flow of operation for a method for safe drive inducing game according to an exemplary embodiment of the present invention.

FIG. 5 is an exemplary flow chart illustrating a flow of operation for a method for safe drive inducing game according to an exemplary embodiment of the present invention. As shown in FIG. 5, the apparatus, executed by a controller, for safe drive inducing game may be configured to monitor a driver's state of the driver while driving the vehicle (S100). When the attention dispersion state of the driver is detected (S110), the apparatus may be configured to execute a safe drive inducing game (S120). Herein, although not shown in FIG. 5, the step of determining whether to execute the safe drive inducing game to the driver may be added prior to step 120, and the safe drive inducing game may be executed at step 120 depending on the driver's selection.

Moreover, although the attention dispersion state of the driver is not detected at step 110, when the execution of the safe driving inducing game is requested by the driver (S115), the apparatus for safe drive inducing game may be configured to execute the safe drive inducing game (S120).

When the safe driving inducing game is executed at step 120, the apparatus may be configured to detect the driving information of the vehicle (S130). Particularly, the apparatus may be configured to recognize a target driving path of the vehicle from the navigation system (S140), and generate a path guidance display based on the target driving path recognized at step S140 and display on the game screen (S150).

Then, the apparatus may be configured to determine whether the corresponding vehicle follows the path guidance display by comparing the driving state of the vehicle detected in real time and the position of the path guidance display displayed on the game screen (S160), and calculate the game score of the safe drive inducing game according to the determining result at step 160 (S170). In particular, when the corresponding vehicle follows the path guidance display, a predetermined game score may be added.

In addition, the apparatus may be configured to determine whether the driving for the corresponding vehicle is safe according to whether the driving state of the vehicle corresponds to the preset safe driving condition (S180), and add or subtract the game score based on the determining result at step 180 (S190). As an example, when the corresponding vehicle drives corresponding to the preset safe driving conditions, the bonus score may be added to the game score, otherwise, the obtained game score may be subtracted.

Step 130 to step 190 are repeatedly executed until a separate command to end the game is input. When the separate command to end the game is input from the driver or a command to exit the game is input as the driving of the vehicle is ended (S200), the corresponding game may end. In addition, FIG. 5 shows that steps 130 to 190 may be operated to execute the safe drive inducing game when a drowsiness state, that is, an attention dispersion state of the driver is detected, but although the attention dispersion state of the driver is not detected, steps 130 to 190 may operate by executing the safe drive inducing game in response to the driver requests.

As set forth above, the exemplary embodiment of the present invention may be configured to execute the safe drive inducing game to display a game screen on the HUD when an attention dispersion state of the driver is detected while driving the vehicle and the driver obtains a game score when driving following the specific display inducing the safe drive to arouse the driver's interest, thereby improving driving concentration and preventing an attention dispersion state from being generated during driving of the vehicle.

Although exemplary embodiments of the present invention have been described in detail hereinabove, it should be clearly understood that many variations and modifications of the basic inventive concepts herein taught which may appear to those skilled in the present art will still fall within the spirit and scope of the present invention, as defined in the accompanying claims.

What is claimed is:

1. An apparatus for safe drive inducing game, comprising:
a controller configured to:
execute a safe drive inducing game when a driver attention dispersion is detected while a vehicle is driven to stimulate driver attention;
recognize a target driving path from vehicle driving information when executing the safe drive inducing game;
generate a path guidance display according to the recognized target driving path to display on a game screen;
determine whether the vehicle follows the path guidance display by comparing a driving state of the vehicle with a position of the path guidance display displayed on the game screen wherein the game screen is displayed on a head up display (HUD) of the vehicle; and
calculate a score of the safe drive inducing game according to whether the vehicle follows the path guidance display,
wherein the controller is further configured to execute the safe drive inducing game and execute the safe drive inducing game based on a driver selection when the driver attention dispersion state is detected and add or subtract a score obtained from the safe drive inducing game based on whether the driving state of the vehicle corresponds to the safe driving condition, and
wherein the vehicle is driven by the driver during the execution of the safe drive inducing game.

2. The apparatus for safe drive inducing game of claim 1, wherein the controller is further configured to detect an attention dispersion state of the driver while the vehicle is driven.

3. The apparatus for safe drive inducing game of claim 2, wherein the controller is further configured to detect the driver attention dispersion state using at least one of an image, biological information, and a driving pattern.

4. The apparatus for safe drive inducing game of claim 1, the controller is further configured to detect driving information including at least one of driving road information, navigation information, control area network (CAN) data, and an inter-vehicle distance.

5. The apparatus for safe drive inducing game of claim 1, wherein the controller is further configured to connect to a game server via a communicator to store and manage game data for each driver and transmit the game data to the game server.

6. A method for safe drive inducing game, comprising:
executing, by a controller, a safe drive inducing game when a driver attention dispersion state is detected while a vehicle is driven to a stimulate driver attention;
recognizing, by the controller, a target driving path from vehicle driving information when executing the safe drive inducing game;
generating, by the controller, a path guidance display according to the recognized target driving path to display on a game screen;

determining, by the controller, whether the vehicle follows the path guidance display by comparing a driving state of the vehicle with a position of the path guidance display displayed on the game screen wherein the game screen is displayed on a head up display (HUD) of the vehicle;

calculating, by the controller, a score of the safe drive inducing game according to whether the vehicle follows the path guidance display;

executing, by the controller, the safe drive inducing game to the driver;

executing, by the controller, the safe driver inducing game based on a driver selection when the driver selection dispersion state is detected; and adding or subtracting, by the controller, a score obtained from the safe drive inducing game based on whether the driving state of the vehicle corresponds to the safe driving condition, wherein the vehicle is driven by the driver during the execution of the safe drive inducing game.

7. The method of claim 6, further comprising:
detecting, by the controller, the driven attention dispersion using at least one of: an image, biological information, and a driving pattern of the driver prior to execute the safe drive inducing game.

8. The method of claim 6, further comprising:
detecting, by the controller, driving information including at least one of: driving road information, navigation information, control area network (CAN) data, and an inter-vehicle distance when the safe drive inducing game is executed.

9. A non-transitory computer readable medium containing program instructions executed by a controller, the computer readable medium comprising:

program instructions that execute a safe drive inducing game when a driver attention dispersion state is detected while a vehicle is driven to stimulate driver attention;

program instructions that recognize a target driving path from vehicle driving information when executing the safe drive inducing game;

program instructions that generate a path guidance display according to the recognized target driving path to display on a game screen;

program instructions that determine whether the vehicle follows the path guidance display by comparing a driving state of the vehicle with a position of the path guidance display displayed on the game screen wherein the game screen is displayed on a head up display (HUD) of the vehicle;

program instructions that calculate a score of the safe drive inducing game according to whether the vehicle follows the path guidance display;

program instructions that execute the safe drive inducing game and execute the safe drive inducing game based on a driver selection when the driver attention dispersion state is detected; and program instructions that add or subtract a score obtained from the safe drive inducing game based on whether the driving state of the vehicle corresponds to the safe driving condition, wherein the vehicle is driven by the driver during the execution of the safe drive inducing game.

10. The non-transitory computer readable medium of claim 9, further comprising:
program instructions that detect the driven attention dispersion using at least one of: an image, biological information, and a driving pattern of the driver prior to execute the safe drive inducing game.

11. The non-transitory computer readable medium of claim 9, further comprising:
program instructions that detect driving information including at least one of: driving road information, navigation information, control area network (CAN) data, and an inter-vehicle distance when the safe drive inducing game is executed.

* * * * *